(12) United States Patent
Fabricius et al.

(10) Patent No.: US 8,424,664 B2
(45) Date of Patent: Apr. 23, 2013

(54) FRICTION PART FOR A FRICTIONALLY ACTING DEVICE

(75) Inventors: Emilio Luciano Giuseppe Fabricius, Oftersheim (DE); Salvatore Contrino, Mannheim (IT)

(73) Assignee: Borgwarner, Inc., Auburn Hills, MI (US)

( * ) Notice: Subject to any disclaimer, the term of this patent is extended or adjusted under 35 U.S.C. 154(b) by 665 days.

(21) Appl. No.: 12/440,761

(22) PCT Filed: Sep. 20, 2007

(86) PCT No.: PCT/EP2007/008176
§ 371 (c)(1),
(2), (4) Date: Sep. 24, 2009

(87) PCT Pub. No.: WO2008/037390
PCT Pub. Date: Apr. 3, 2008

(65) Prior Publication Data
US 2010/0006388 A1    Jan. 14, 2010

(30) Foreign Application Priority Data
Sep. 26, 2006   (DE) .................... 10 2006 045 456

(51) Int. Cl.
*F16D 13/64* (2006.01)
*F16D 13/72* (2006.01)

(52) U.S. Cl.
USPC ................................ 192/113.36; 192/107 R

(58) Field of Classification Search ............. 192/113.36, 192/113.22
See application file for complete search history.

(56) References Cited

U.S. PATENT DOCUMENTS

| | | | | |
|---|---|---|---|---|
| 5,094,331 | A | * | 3/1992 | Fujimoto et al. ......... 192/113.36 |
| 5,460,255 | A | | 10/1995 | Quigley |
| 5,799,763 | A | * | 9/1998 | Dehrmann ............... 192/113.36 |
| 2004/0074733 | A1 | * | 4/2004 | Suzuki et al. ............ 192/113.36 |
| 2007/0278062 | A1 | * | 12/2007 | Tsuboi et al. .............. 192/70.12 |

FOREIGN PATENT DOCUMENTS

| | | |
|---|---|---|
| DE | 43 02 773 A1 | 8/1993 |
| EP | 1 371 866 A1 | 3/2010 |
| WO | WO 2005/085667 A1 * | 9/2005 |

* cited by examiner

*Primary Examiner* — Rodney Bonck
(74) *Attorney, Agent, or Firm* — Miller, Matthias & Hull LLP

(57) ABSTRACT

The present invention relates to a friction part for a frictionally acting device, having an annular friction face which has an inner edge and an outer edge, wherein at least one set of grooves is provided in the friction face, which set of grooves has a first groove which extends from the inner edge or the outer edge to a branching point between the inner edge and the outer edge, and a second and third groove which extend in each case from the branching point to the other edge. According to the invention, the second groove is inclined in the one peripheral direction and the third groove is inclined in the other peripheral direction of the direction face with respect to a radial line through the branching point. The present invention also describes a frictionally acting device having a frictions part of said type.

6 Claims, 4 Drawing Sheets

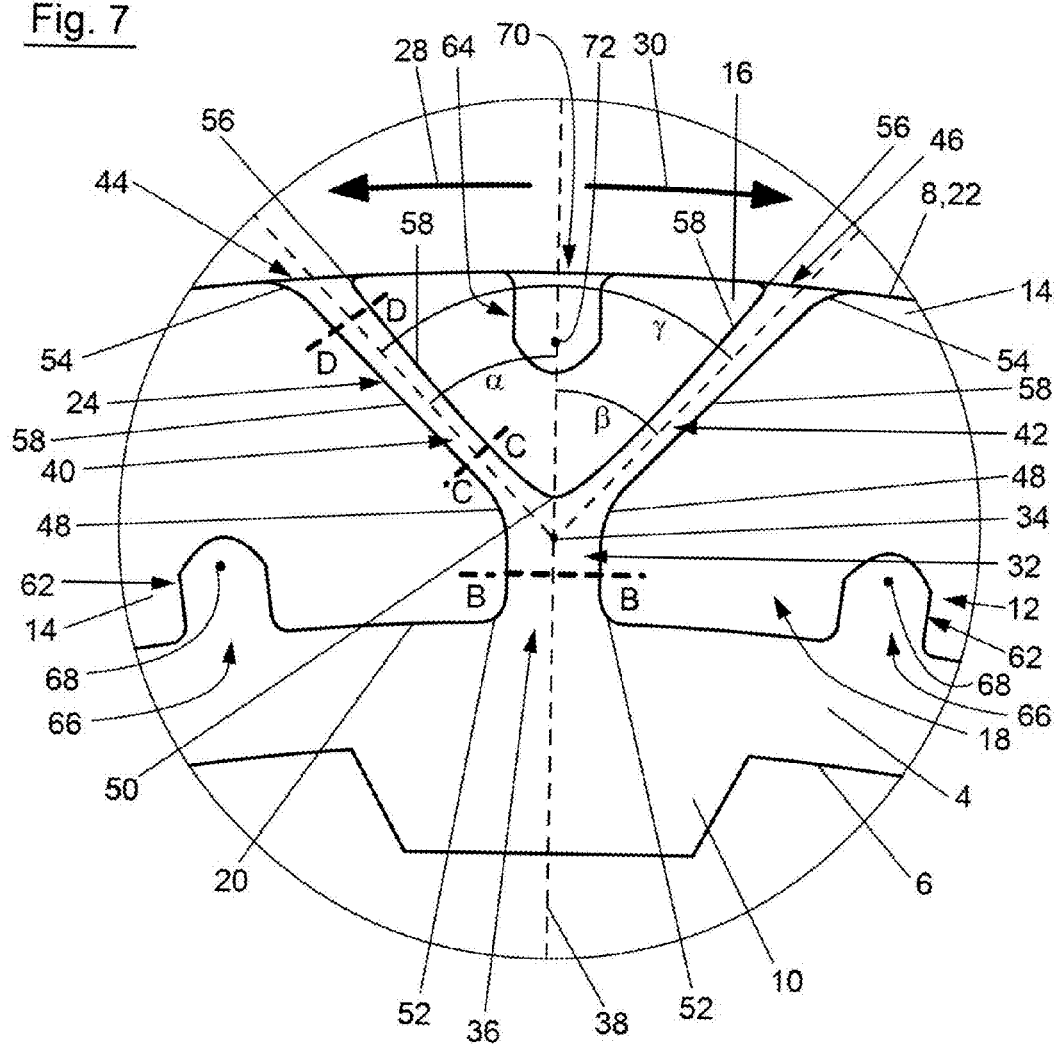

FRICTION PART FOR A FRICTIONALLY ACTING DEVICE

CROSS-REFERENCE TO RELATED APPLICATIONS

This application is a U.S. national stage filing of International Patent Application No. PCT/EP2007/008176 filed on Sep. 20, 2007, which claims priority under the Paris Convention to German Patent Application No. 10 2006 045 456.1, filed on Sep. 26, 2006.

FIELD OF THE DISCLOSURE

The present invention relates to a friction part for a frictionally acting device, having an annular friction surface which has an inner edge and an outer edge, with at least one set of grooves being provided in the friction surface, said set of grooves having a first groove which extends from the inner edge or the outer edge to a branching point between the inner edge and the outer edge, and a second and third groove which extend in each case from the branching point to the other edge. The present invention also relates to a clutch for a motor vehicle having a friction part of said type.

BACKGROUND OF THE DISCLOSURE

The prior art discloses a multiplicity of friction parts for frictionally acting devices, such as for example plates for multiplate clutches or multiplate brakes or synchronizing rings for synchronizing devices, in which the friction part has a friction surface in which are provided grooves which form a groove pattern.

For example, EP 1 371 866 A1 describes a plate for a wet-running multiplate clutch with an annular friction surface. The friction surface has an inner delimiting edge and an outer delimiting edge. At least one groove is provided in the friction surface, which groove runs from the inner delimiting edge to the outer delimiting edge. Here, the groove is divided into a first partial section, which runs from the inner delimiting edge to a deflection point between the delimiting edges, and a second partial section, which runs from the deflection point to the outer delimiting edge, with the second partial section being angled with respect to the first partial section by a predetermined angle. During operation, a punctiform pressure increase in the through-flowing coolant, such as for example oil, occurs at said deflection point, as a result of which adjacent plates of the multiplate clutch are pushed apart from one another. This in turn has the result that the multiplate clutch which is placed out of frictional engagement has a reduced drag torque.

U.S. Pat. No. 5,460,255 describes a wet-running friction clutch which comprises one or more friction plates, on the sides of which are provided annular friction surfaces. The friction surfaces are formed by the surface of a friction lining, specifically a paper friction lining. Here, the friction lining is divided into a plurality of friction lining segments which are arranged on or fastened to the friction plates, with grooves remaining between the friction lining segments, which grooves extend from an inner edge of the friction surface to an outer edge of the friction surface. The individual friction lining segments were cut previously from a continuous strip of the friction lining, such that little friction lining waste was generated. In one specific embodiment of the friction plate, use is made exclusively of triangular friction lining segments. Said triangular friction lining segments are arranged such that, in the circumferential direction of the friction surface, a groove which is inclined forward with respect to a radial line always alternates with a groove which is inclined rearward with respect to the radial line.

A further plate-like friction lining for an automatic transmission or the like is known from DE 43 02 773 A1. The friction part described in said document comprises an annular-disk-shaped retaining plate on which is provided an annular friction surface which is delimited by an inner edge at one side and by an outer edge at the other side. A plurality of sets of grooves are provided in the friction surface, which sets of grooves comprise in each case one first groove, which extends from the inner edge to the outer edge, and one second groove, which extends from a point, which is situated between the inner edge and the outer edge, on the first groove to the outer edge. With regard to the predefined rotational direction of the friction part, both grooves are inclined obliquely rearward with respect to the radial line, with the second groove having a more pronounced inclination. The sets of grooves which are designed in this way are intended to lead to a fast removal of the oil film between the friction part and the associated counterpart in the event of the actuation of the clutch, in order to obtain a high coefficient of friction at an early stage.

The above-described prior art is afflicted with various disadvantages. For example, the speed of the oil film removal has room for improvement in order to obtain a complete frictionally engaging action between the friction part and its counterpart as early as possible. Furthermore, the known groove pattern does not ensure satisfactory cooling of the friction lining or of the friction surface by means of the oil flowing through the grooves. Furthermore, the high pressure of the oil may result in the friction lining being damaged, in particular if said friction lining is a paper friction lining which is applied to the friction plate. A further disadvantage of the known friction part is that the so-called drag torque is not reduced to such a significant extent, or eliminated, by the known groove pattern. It should also be mentioned that the installation of the known friction plate into a clutch must be carried out with great care, since the alignment of the grooves must correspond to the rotational direction, and this makes the production of a clutch composed of the known friction plates more difficult.

SUMMARY OF THE DISCLOSURE

It is therefore an object of the present invention to create a friction part for a frictionally acting device, which friction part ensures a fast oil film removal from the friction surface in the event of an actuation, efficient cooling of the friction surface, and simple assembly of the friction part, with it also being the aim to ensure a low drag torque and reliable functioning of the applied friction lining, if present. The present invention is also based on the object of creating a motor vehicle having an advantageous friction part of said type, which frictionally acting device permits a jerk-free or harmonic closure of the device regardless of oil volume, pressure and temperature.

Said object is achieved by means of the features specified in patent claims 1 and 24. Advantageous embodiments of the invention are the subject matter of the subclaims.

The friction part according to the invention for a frictionally acting device has an annular friction surface. The friction surface comprises an inner edge and an outer edge, with at least one set of grooves being provided in the friction surface, said set of grooves having a first, second and third groove. The first groove extends from the inner edge or from the outer edge to a branching point between the inner edge and the outer edge. In the second case, the friction part is preferably used in a frictionally acting device in which the coolant within the device is forced to flow from the outside to the inside. The second groove and also the third groove extend from the branching point to the other edge, that is to say to the outer edge or inner edge. According to the invention, the second groove is inclined in the one circumferential direction, and the third groove is inclined in the other circumferential direction, with respect to a radial line through the branching point.

The friction part according to the invention firstly has the advantage that the assembly thereof is simplified since the second groove is inclined in the one circumferential direction and the third groove is inclined in the other circumferential direction, as a result of which the friction part is substantially independent of rotational direction and can therefore be installed into the clutch with any desired orientation. In the case of a friction part with a set of grooves which is formed in this way, an increased pressure is generated in the region of the branching point in the coolant of the frictionally acting device, such as for example oil, during operation, which increased pressure causes adjacent friction partners to be pushed apart from one another. This reduces the so-called drag torque. Furthermore, the first groove which is situated upstream of the second and third grooves serves as a type of pressure limiter which reduces the pressure at the branching point to such an extent that the friction linings, in particular when these are paper friction linings, are not damaged or the oil is not pressed again onto the friction surface between the friction partners. Furthermore, the set of grooves of the friction part according to the invention leads to a fast removal of the oil film from the friction surface, and to effective cooling of said friction surface. It has also been proven that the use of the friction lining in a clutch or the like leads to a clutch which permits jerk-free or harmonic closure regardless of oil volume, pressure and temperature.

In one preferred embodiment of the friction part according to the invention, the first groove extends from the inner edge to the branching point. This makes the friction parts according to the invention advantageous for use in a frictionally acting device in which the coolant, such as for example oil, is driven through the grooves from the inside radially to the outside.

In a further preferred embodiment of the friction part according to the invention, the set of grooves is formed in a Y-shape. The set of grooves according to this embodiment of the friction part accordingly does not involve a first groove which opens out into an annular groove, since the above-stated advantages, such as in particular effective cooling and fast oil film removal, cannot be obtained to such an extent.

In a further preferred embodiment of the friction part according to the invention, the Y-shaped set of grooves has only three edge-side openings. Here, edge-side openings are to be understood to mean the openings of the first, second and third grooves at the inner or outer edge of the friction surface.

According to one particularly preferred embodiment of the friction part according to the invention, the set of grooves is formed exclusively in a Y-shape. In this way, a particularly advantageous flow behavior within the set of grooves and therefore good controllability of the frictionally acting device are obtained by means of a friction part of said type.

To obtain an exclusively Y-shaped set of grooves, in a further preferred embodiment of the friction part according to the invention, the set of grooves is composed exclusively of the first, second and third grooves.

Also, to obtain an exclusively Y-shaped set of grooves, the first, second and third grooves are merged, so as to end, at the branching point. This means that none of the first, second and third grooves extends beyond the branching point, which would correspond to the creation of a further groove, and would therefore entail a deviation from the exclusively Y-shaped set of grooves.

To substantially realize the rotational direction independence mentioned in the introduction, in a further preferred embodiment of the friction lining according to the invention, the first groove extends along the radial line which extends through the branching point. Here, the first groove is preferably of rectilinear design.

To realize a particularly fast removal of the oil film from the friction surface and effective cooling of said friction surface, in a further particularly preferred embodiment of the friction lining according to the invention, a branching angle of less than 180° is formed between the second and third grooves. Here, the branching angle is to be understood to mean the angle between the second and third grooves, which angle is formed between those sides of the second and third grooves which face away from the first groove.

It has been found that a friction part with particularly effective cooling of the friction surface and a fast removal of the oil film is provided by means of a further preferred embodiment of the invention in which the branching angle is between 76° and 86°, and is preferably 81°.

In one advantageous embodiment of the friction part according to the invention, the angle of inclination of the second groove with respect to the radial line which extends through the branching point corresponds to the angle of inclination of the third groove with respect to said radial line. This further feature serves to provide almost complete rotational direction independence of the friction part, which facilitates the assembly of the friction part within the device considerably.

According to a further advantageous embodiment of the friction part according to the invention, the second groove and the third groove have in each case one outlet opening which, depending on the alignment of the set of grooves, is situated at the outer edge or the inner edge.

In one preferred embodiment of the friction part according to the invention, the one outlet opening is arranged in front of the radial line, which extends through the branching point, in the one circumferential direction and the other outlet opening is arranged in front of said radial line the other circumferential direction. This ensures inter alia almost complete rotational direction independence of the friction part.

In a further advantageous embodiment of the friction part according to the invention, the first groove has an inlet opening which, depending on the alignment of the set of grooves, is situated at the inner edge or outer edge. The coolant can enter into the first groove through the inlet opening during operation of the friction part.

To obtain the abovementioned pressure in the region of the branching point, which pressure ultimately leads to a reduction in the drag torque, in a further advantageous embodiment of the friction part according to the invention, the smallest groove cross section of the first groove is larger than the smallest groove cross section of the second groove and is larger than the smallest groove cross section of the third groove. Here, the groove cross section denotes the cross-sectional area, with the groove cross section running in a plane transversely with respect to the direction of extent of the respective groove.

According to a further particularly preferred embodiment of the friction part according to the invention, the smallest groove cross section of the first groove is larger than the largest groove cross section of the second groove and is larger than the largest groove cross section of the third groove. In particular, the first groove which is designed to be larger in this way prevents turbulence within the set of grooves, which can lead to flow separation. In this way, with an exclusively Y-shaped set of grooves, a particularly effective temperature reduction, and therefore an improved absorption of heat, is obtained on account of a relatively slow flow within the set of grooves.

In a further advantageous embodiment of the friction part according to the invention, the groove cross section of the second and third grooves is constant in the direction of the outlet opening. In this embodiment, a smaller vacuum is generated at the outlet openings of said grooves than is the case in the embodiment specified below. A friction part of said type may therefore be particularly advantageously used in a frictionally acting device in which a small amount of oil is used.

To obtain a friction part in which the advantages according to the invention are particularly pronounced, in a further preferred embodiment of the friction part according to the invention, the groove cross section of the second and third grooves increases in size in the direction of the outlet opening. In this way, a diffuser effect is generated within the second and third grooves, which diffuser effect generates an increased dynamic pressure at the branching point, a fast removal of the oil film from the friction surface, and effective cooling of the friction part.

The above-stated advantages are even more pronounced in a further preferred embodiment of the friction part according to the invention in which the groove cross section of the second and third grooves increases in size continuously, that is to say not discontinuously.

To now make particularly advantageous use of the diffuser effect of a groove cross section which increases in size in the direction of the outlet opening, in one particularly preferred embodiment of the friction part according to the invention, the groove cross section of the second and third grooves is at its largest at the respective outlet opening.

In a further advantageous embodiment of the friction part according to the invention, a variation of the groove cross section of the grooves in the direction of extent is effected exclusively by means of a variation of the groove width in the direction of extent. This is advantageous from a production aspect, especially since it has been found that the groove width is easier to monitor or check than the groove depth.

In a further particularly preferred embodiment of the friction part according to the invention, the set of grooves is formed so as to be symmetrical in relation to the radial line. In this way, complete rotational direction independence of the friction part is obtained, which firstly simplifies assembly and secondly also permits the use in a frictionally acting device in which the friction part should be rotatable in both rotational directions.

It is basically also possible for the friction surface to be formed by the surface of a single-piece friction plate. In one advantageous embodiment of the friction part according to the invention, however, the friction part has a lining carrier and, arranged on the lining carrier, a friction lining, preferably a paper friction lining, for forming the friction surface. The friction lining is preferably a paper friction lining. Paper friction linings of said type are composed for example of wood or cotton fibers, carbon and glass fibers, which are connected to one another by means of synthetic resin, such as for example epoxide or phenol. Significantly more flexible production of the friction parts is permitted on account of the separate production of the friction lining and friction lining carrier and the later combination thereof.

In a further preferred embodiment of the friction part according to the invention, the friction lining comprises a plurality of friction lining segments which are arranged on the friction lining carrier in such a way that the grooves are formed between the friction lining segments. In this way, less material is consumed during the production of the friction lining, which leads to high cost savings in particular in the case of expensive paper friction linings. Use is therefore made of friction lining material only where friction surfaces are to be formed, whereas friction lining material is omitted in the region of the grooves, the base of which is now formed by the friction lining carrier. This does not apply in the case of friction linings into which the grooves are embossed. The embossing of the grooves also leads to an increased thickness of the friction lining in the edge region of the groove, which would impede the controllability of a frictionally acting device having a friction lining of said type. In contrast, a lower thickness variation is provided in the case of a friction lining composed of friction lining segments, which leads to improved controllability of the frictionally acting device. In the case of the grooves being embossed, it may also occur that the first groove is not even generated if the inner edge of the friction lining is offset outward to too great an extent. This risk therefore does not exist in the embodiment according to the invention, such that production is also simplified.

To prevent the friction lining being damaged during operation, for example on account of the high pressure within the grooves, in one particularly preferred embodiment of the friction part according to the invention, those ends of the friction lining segments which face toward the branching point are rounded, especially since the non-rounded corners have a lower level of mechanical stability than the rounded corners.

To obtain the above-stated advantage in the region of the inlet and outlet openings, in a further advantageous embodiment of the friction part according to the invention, those corners of the friction lining segments which face toward the inlet and/or outlet openings are rounded.

According to a further preferred embodiment of the friction part according to the invention, the friction part is a plate for a multiplate clutch or a multiplate brake.

In a further particularly preferred embodiment of the friction part according to the invention, at least one blind groove is also provided in the friction surface, which at least one blind groove extends from the inner edge or the outer edge to an end point between the inner edge and the outer edge. It is thus possible during operation for a vacuum to be generated for example in the region of the blind groove which is provided at the outer edge, while an excess pressure is generated at the outlet openings of the set of grooves. In this way, the oil or the like is sucked out of the region of the outlet openings into the region of the blind groove, as a result of which a particularly effective cooling action at the friction part and improved controllability of the frictionally acting device is obtained.

In a further advantageous embodiment of the friction part according to the invention, the blind groove has an edge-side opening, that is to say an opening at the outer edge or at the inner edge of the friction surface, which is arranged directly adjacent to the one outlet opening in the one circumferential direction and directly adjacent to the other outlet opening in the other circumferential direction. Here, the term "directly" is to be understood to mean that, in the two circumferential directions, no further groove openings or the like are arranged between the edge-side opening of the blind groove and the outlet openings in the respective edge of the friction surface.

According to a further advantageous embodiment of the friction part according to the invention, the blind groove is arranged in the circumferential direction between the second and third grooves of the same set of grooves.

The frictionally acting device according to the invention for a motor vehicle, preferably a clutch, a brake or a synchronizing device, has at least one friction part of the type according to the invention. With regard to the advantages of the invention, reference is made to the above description of the friction part according to the invention.

In one preferred embodiment of the frictionally acting device according to the invention, the clutch is a wet-running and/or multiplate clutch or the brake is a multiplate brake.

BRIEF DESCRIPTION OF THE DRAWINGS

The invention is explained in more detail below on the basis of an exemplary embodiment of the invention with reference to the appended drawings, in which:

FIG. 7 shows an enlarged illustration of the detail A from FIG. 6.

DETAILED DESCRIPTION OF THE DISCLOSURE

Figure 1:
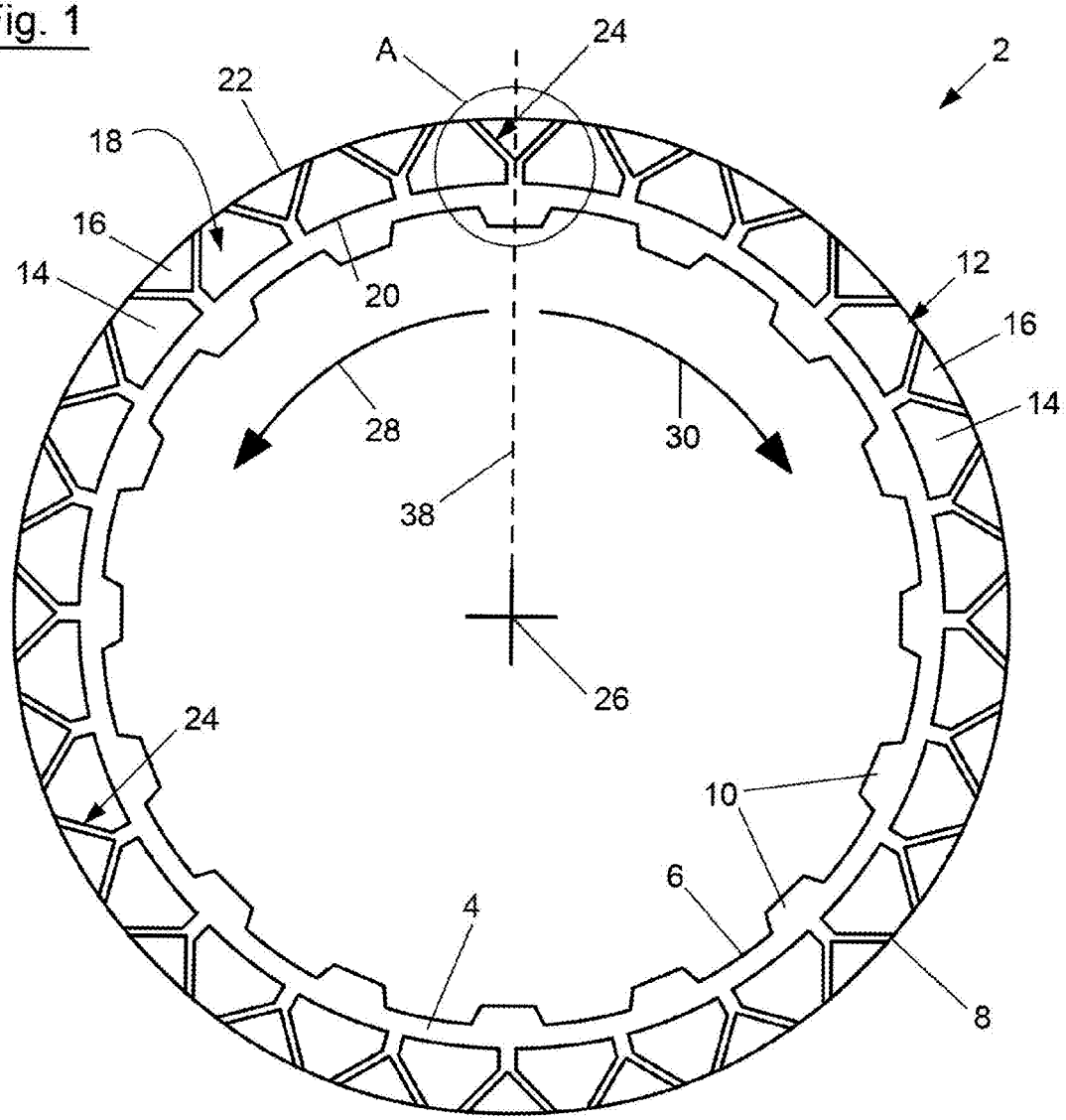
FIG. 1 shows a front view of one embodiment of the friction part according to the invention.

FIG. 1 shows a first embodiment of the friction part 2 according to the invention for a frictionally acting device. The friction part 2 which is shown is embodied in the present case as a plate for a multiplate clutch and has, firstly, a lining carrier 4. The lining carrier 4 is embodied as an annular steel disk and comprises an inner edge 6 and an outer edge 8. Radially inwardly projecting teeth 10 are provided at the inner edge 6, which teeth 10 are formed in one piece with the annular disk and are spaced apart from one another in the circumferential direction. By means of the teeth 10, it is possible for the plate, which is consequently a so-called inner plate, to be rotationally fixedly connected to a shaft of the clutch. However, it is pointed out that the friction part 2 according to the invention may likewise be an outer plate, in which the teeth would then be arranged at the outer edge 8.

In each case one friction lining 12 is arranged on the front side, which faces toward the viewer, of the lining carrier 4 and on the rear side, which faces away from the viewer, of the lining carrier 4 (FIGS. 3 to 5), which friction lining 12 is a paper friction lining in the illustrated embodiment. Here, the friction lining 12 is composed of a plurality of friction lining segments 14, 16 which are arranged so as to be spaced apart from one another on the front and rear sides of the friction lining carrier 4. That side of the friction lining 12 or of the individual friction lining segments 14, 16 which faces away from the friction lining carrier 4 forms the friction surface 18. Here, the friction lining segments 14, 16 are arranged so as to form a substantially annular friction surface 18. The annular friction surface 18 has an inner edge 20, which is arranged further outward in the radial direction than the inner edge 6 of the friction lining carrier 4, and an outer edge 22, which corresponds to the outer edge 8 of the friction lining carrier 4, that is to say in the illustrated embodiment, the friction lining 12 extends up to the outer edge 8 of the friction lining carrier 4.

The friction lining segments 14, 16 are arranged on the friction lining carrier 4 in such a way that a multiplicity of grooves is formed between the friction lining segments 14, 16 or between the edges of the friction lining segments 14, 16, which grooves form at least one Y-shaped set of grooves 24 within the friction surface 18. Said Y-shaped set of grooves 24 repeats at regular intervals along the entire friction surface 18, and is described in more detail later with reference to FIG. 2. In the installed state, the friction part 2 may be rotated about a rotational axis 26 which extends perpendicularly to the plane of the friction part 2 and therefore perpendicular to the drawing plane. Here, the friction part 2 may be rotated both in the one circumferential direction 28 of the friction surface 18 and also in the other, or opposite, circumferential direction 30 of the friction surface 18.

Figure 2:
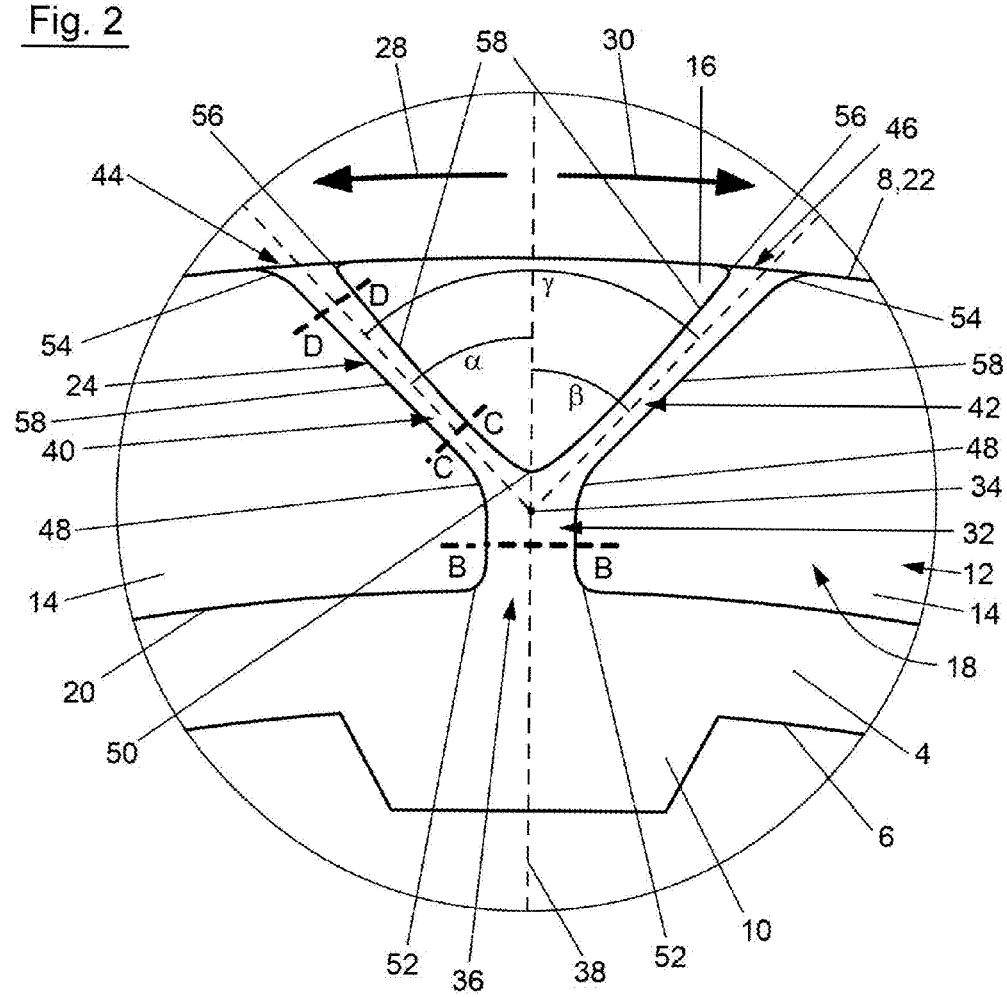
FIG. 2 shows an enlarged illustration of the detail A from FIG. 1.

The design of a single set of grooves 24 as a representative of all the sets of grooves 24 in the friction surface 18 is explained below, by way of example, with reference to FIG. 2 which is an enlarged illustration of the detail A from FIG. 1.

The set of grooves 24 firstly has a first groove 32 which extends from the inner edge 20 of the friction surface 18 to a branching point 34. Here, the first groove 32 forms a radially inwardly pointing inlet opening 36 at the inner edge 20 of the friction surface 18. The branching point 34, in contrast, is arranged between the inner edge 20 and the outer edge 22 of the friction surface 18, that is to say amidst the friction surface 18. A radial line 38 which extends from the rotational axis 26 (FIG. 1) also extends outward through the branching point 34, which radial line 38 is illustrated by dashed lines in FIGS. 1 and 2. The first groove 32 extends rectilinearly along said radial line 38 between the inlet opening 36 and the branching point 34.

The set of grooves 24 also has a second groove 40 and a third groove 42. Both the second and third grooves 40, 42 extend from the branching point 34 to the outer edge, specifically the outer edge 8, of the friction surface 18, where said second and third grooves 40, 42 form in each case one outlet opening 44, 46. Here, the second groove 40 is inclined by an angle of inclination α in the one circumferential direction 28 of the friction surface 18, while the third groove 42 is inclined by an angle of inclination β in the other, or opposite, circumferential direction 30 of the friction surface 18, with respect to the radial line 38 through the branching point 34. In the illustrated embodiment, the angles of inclination α and β are identical or of equal magnitude, with the grooves 40, 42—as already mentioned—merely being inclined in opposite directions with respect to the radial line 38. The profile of the second and third grooves 40, 42 is selected here such that the one inlet opening 44 is arranged in front of the radial line 38 in the one circumferential direction 28 and the other outlet opening 46 is arranged in front of the radial line 38 in the other circumferential direction 30. The two grooves 40, 42 have a substantially rectilinear profile.

Furthermore, a branching angle γ is formed between the second and third grooves 40, 42 on the side facing away from the first groove 32, which branching angle γ ultimately corresponds to the sum of the angles of inclination α and β. In the illustrated embodiment, said branching angle γ is 81°. The branching angle γ should basically be less than 180° and should advantageously be between 76° and 86°.

The Y-shaped set of grooves 24 has merely three edge-side openings, specifically the inlet opening 36 at the inner edge 20 of the friction surface 18 and the two outlet openings 40, 42 at the outer edge 22 of the friction surface 18. In the illustrated embodiment, the set of grooves 24 is formed exclusively in a Y-shape, which means in the present case that the set of grooves 24 is composed exclusively of the first, second and third grooves 32, 40, 42, which are merged, so as to end, at the branching point 34.

To prevent damage to the friction lining segments 14, 16 in the region of the branching point 34 during operation of the frictionally acting device, those corners 48 of the friction lining segments 14 which face toward the branching point 34 and that corner 50 of the friction lining segment 16 which faces toward the branching point 34 are rounded. Furthermore, those corners 52 of the friction lining segments 14 which face toward the inlet opening 36 are rounded. Furthermore, those corners 54 of the friction lining segments 14 which face toward the outlet openings 44, 46 and those corners 56 of the friction lining segment 16 which face toward the outlet openings 44, 46 are also rounded.

The further design of the individual grooves 32, 40, 42 of the set of grooves 24 is explained below with reference to FIGS. 2 to 5, with the design of the two grooves 40, 42 being explained by way of example on the basis of the second groove 40, since said grooves 40, 42 have a substantially identical design, especially since the set of grooves 24 is formed so as to be symmetrical in relation to the radial line 38 through the branching point 34. If the radial line 38 is considered as an axis, it is also possible for this to be referred to as axial symmetry.

Figure 3:
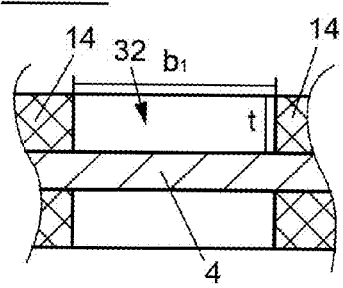
FIG. 3 shows a cross section along the section line B-B from FIG. 2.
Figure 4:
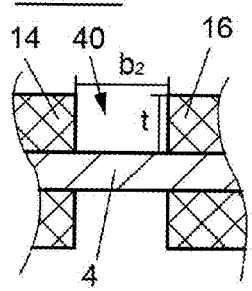
FIG. 4 shows a cross section along the section line C-C from FIG. 2.
Figure 5:
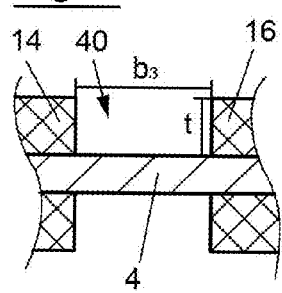
FIG. 5 shows a cross section along the section line D-D from FIG. 2.

The smallest groove cross section of the first groove 32 is larger than the smallest groove cross section of the second and third grooves 40 and 42, as can also be seen from a comparison of the groove cross sections between FIGS. 3 and 4. Furthermore, the smallest groove cross section of the first groove 32 is larger than the largest groove cross section of the second groove 40 and larger than the largest groove cross section of the third groove 42, as can be seen inter alia from a comparison between the smallest groove cross section of the first groove 32 in FIG. 3 and the groove cross section of the second and third grooves 40, 42 in the region of the outlet opening 44, 46.

The groove cross section of the second and third grooves 40, 42 increases in size continuously in the direction of the outlet openings 44, 46 at the outer edge 22 of the friction surface 18, such that the groove cross section is at its greatest at the outer edge 22 or at the outlet openings 44, 46. Said continuous increase in size is provided for example in that at least one edge 58 of the friction lining segments 14, 16, which edge 58 forms the lateral delimitation of the respective groove 40, 42, is arched in the direction of the respective groove 40, 42. In the present example, said edge is in each case the edge 58 of the friction lining segment 16. In addition to the fact that, in the embodiment shown, both the front and rear sides of the friction lining carrier 4 are provided with a friction lining 12, it can also be seen from FIGS. 3 to 5 that the variation of the groove cross section of the grooves 32, 40, 42 in the direction of extent is effected exclusively by means of a variation of the groove width $b_x$, whereas the groove depth t is predefined by the thickness of the friction lining 12. For FIGS. 3 to 5, it is true that $b_1 > b_3 > b_2$.

Further features, and the mode of operation of the friction part 2 when used in an embodiment of a wet-running clutch, are described below in particular with reference to FIG. 2.

During operation of the clutch, a coolant, such as for example oil, flows through the inlet opening 36 into the first groove 32 in the friction surface 18, and passes to the branching point 34. From there, the oil can flow onward through the second and third grooves 40, 42 to the outlet openings 44, 46, where it emerges out of the set of grooves 24 again.

As a result inter alia of the increase in size of the groove cross section of the second and third grooves 40, 42 in the direction of the outlet openings 44, 46, a diffuser effect is obtained which generates a higher pressure at the branching point 34. An increased pressure of said type leads to a reduction in the so-called drag torque when the friction part is not in frictional engagement. The presence of the first groove 32, which leads to the branching point 34, nevertheless has a pressure-limiting effect, such that the adjoining friction lining 12 is not damaged. The rounded corners 48, 50 of the friction lining segments 14, 16 in the region of the branching point 34 also prevent damage to the friction lining 12. In the actuated state of the clutch, the friction part 2 with the set of grooves 24 serves to bring about a fast removal of the oil film between the friction partners, and to provide effective cooling of the friction lining 12 or of the friction surface 18.

Figure 6:
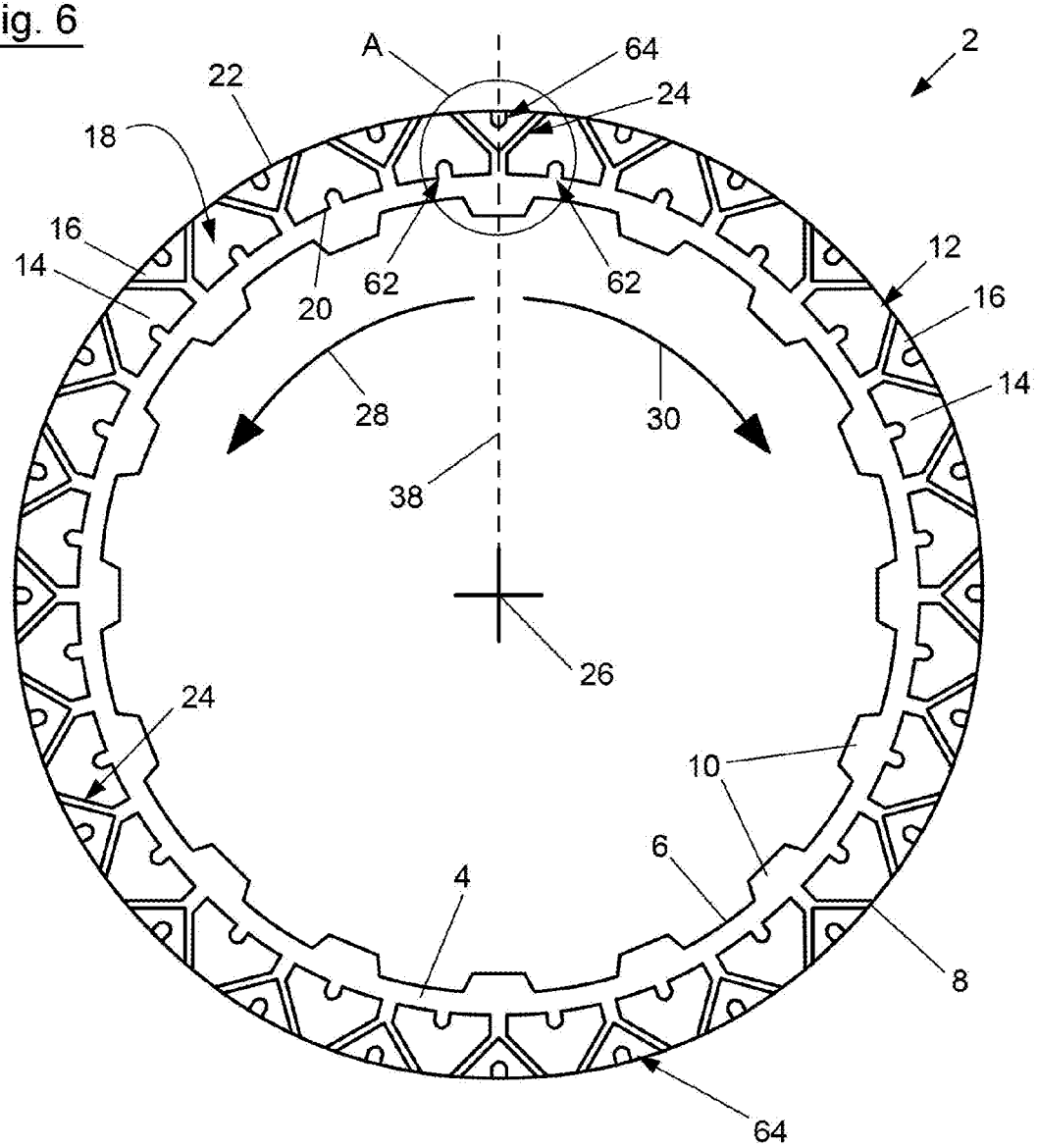
FIG. 6 shows a front view of a second embodiment of the friction part according to the invention.

FIG. 6 shows a second embodiment of the friction part 60 according to the invention for a frictionally acting device. The friction part 60 substantially corresponds to the friction part 2 in the first embodiment, such that only the differences with respect to the first embodiment are explained below. The same reference symbols are used for identical or similar parts, such that the above description of the first embodiment applies correspondingly in this regard.

First blind grooves 62 and second blind grooves 64 are provided in the friction surface 18 of the friction part 60 in addition to the sets of grooves 24, which blind grooves 62, 64 are not connected to the sets of grooves 24. The first blind grooves 62 are provided in the friction lining segments 14 and extend from a first edge-side opening 66 at the inner edge 20 to a first end point 68 between the inner edge 20 and the outer edge 22 of the friction surface 18 (FIG. 7). The second blind grooves 64 are provided in the friction lining segments 16 and extend from a second edge-side opening 70 at the outer edge 22 to a second end point 72 between the outer edge 22 and the inner edge 20 of the friction surface 18 (FIG. 17).

The first edge-side opening 66 is arranged directly adjacent to the inlet opening 36 of one set of grooves 24 (not visible in FIG. 7) in the one circumferential direction 28 and directly adjacent to the inlet opening 36 of another set of grooves 24 (visible in FIG. 7) in the other circumferential direction 30. The second blind groove 64 is arranged in the circumferential direction 28 or 30 between the second groove 40 and the third groove 42, or between the third groove 42 and the second groove 40, with the two grooves 40, 42 being the second and third grooves 40, 42 of the same set of grooves 24. The second edge-side opening 70 of the second blind groove 64 is thus arranged directly adjacent to the outlet opening 44 of the second groove 40 in the one circumferential direction 28 and directly adjacent to the outlet opening 46 of the third groove 42 in the other circumferential direction 30.

LIST OF REFERENCE SYMBOLS

2 Friction part
4 Friction lining carrier
6 Inner edge of the friction lining carrier
8 Outer edge of the friction lining carrier
10 Teeth
12 Friction lining
14, 16 Friction lining segments
18 Friction surface
20 Inner edge of the friction surface
22 Outer edge of the friction surface
24 Set of grooves
26 Rotational axis of the friction part
28 One circumferential direction 30 Other/opposite circumferential direction
32 First groove
34 Branching point
36 Inlet opening
38 Radial line through the branching point
40 Second groove
42 Third groove
44, 46 Outlet openings
48, 52, 54, 56 Rounded corners
50 Rounded corner
58 Edges
60 Friction part
62 First blind grooves
64 Second blind grooves
66 First edge-side opening
68 First end point
70 Second edge-side opening
72 Second end point
$b_x, b_1, b_2, b_3$ Groove widths
t Groove depth
α Angle of inclination of the second groove
β Angle of inclination of the third groove
γ Branching angle

The invention claimed is:

1. A friction part for a frictionally acting device, comprising:
an annular friction surface having an inner edge and an outer edge, with at least one set of rectilinear grooves being provided in the friction surface, said set of grooves having a first groove which defines a radial line extending from the inner edge to a branching point between the inner edge and the outer edge, and second and third groves extending in each case from the branching point to the outer edge, the second groove forming a first angle oriented in one circumferential direction, and the third groove forming a second angle oriented in the opposite circumferential direction;
wherein both second and third groove orientation angles are referenced with respect to the radial line to the branching point, the set of grooves being formed in a Y-shape having only three edge-side openings, the first, second and third grooves being merged so as to end at the branching point, a branching angle of less than 180° being formed between the second and third grooves, the branching angle being between 76° and 86°;
wherein the orientation angle of the second groove with respect to the radial line equals the orientation angle of the third groove with respect to the radial line, and the second groove and the third groove have in each case one outlet opening, the one outlet opening being arranged in front of the radial line in the one circumferential direction, and the other outlet opening arranged in front of the radial line in the opposite circumferential direction, and the first groove having an inlet opening; and
wherein the cross sections of each of the second and third grooves increase in size continuously in the direction of the outlet openings, and the smallest groove cross section of the first groove is larger than the smallest groove cross section of the second groove and is larger than the smallest groove cross section of the third groove.

2. The friction part as claimed in claim 1, wherein the smallest groove cross section of the first groove is larger than the largest groove cross section of the second groove and is larger than the largest groove cross section of the third groove.

3. The friction part as claimed in claim 1, wherein the groove cross section of each of the second and third grooves is at its largest at the outlet opening.

4. The friction part as claimed in claim 1, wherein at least one blind groove is also provided in the friction surface, which at least one blind groove extends from the inner edge or the outer edge to an end point between the inner edge and the outer edge.

5. The friction part as claimed in claim 4, wherein the blind groove has an edge-side opening which is arranged directly adjacent to the one outlet opening in the one circumferential direction and directly adjacent to the other outlet opening in the other circumferential direction.

6. The friction part as claimed in claim 4, wherein the blind groove is arranged in the circumferential direction between the second and third grooves of the same set of grooves.

* * * * *